June 16, 1964   P. SCHLUMBOHM   3,137,740
FAN WITH EVAPORATIVE COOLING EFFECT
Filed March 6, 1961
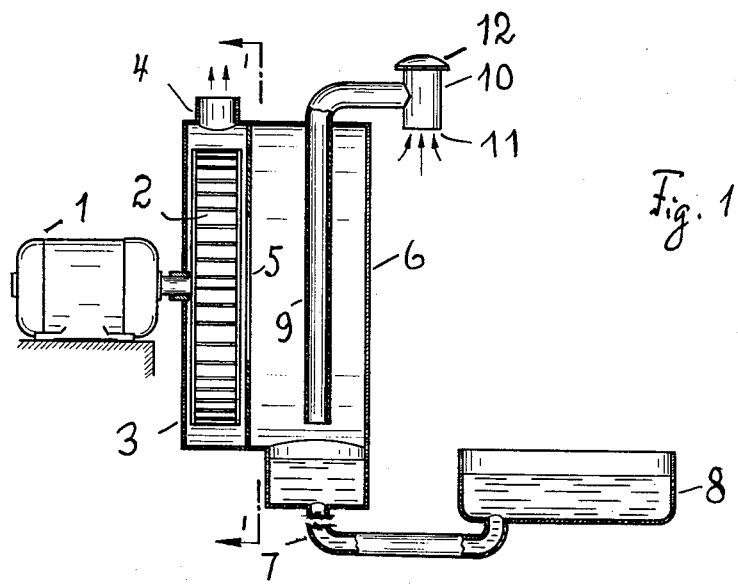
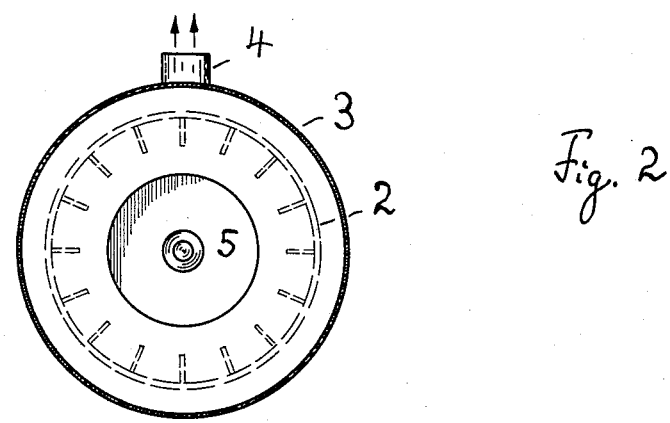
SECTION I-I
INVENTOR.

3,137,740
FAN WITH EVAPORATIVE COOLING EFFECT
Peter Schlumbohm, New York, N.Y.; Francis J. Gorman, executor of said Peter Schlumbohm, deceased
Filed Mar. 6, 1961, Ser. No. 93,474
2 Claims. (Cl. 261—24)

The present invention relates to a fan with an evaporative cooling effect. This application is a continuation-in-part of my copending patent application Serial No. 799,608, now Patent No. 2,973,829.

The parent application refers to a method and apparatus for pumping gases centrifugally from a space of starting pressure to a space of higher pressure by letting the gas flow through an entry zone into a centrifuging zone, maintaining in the centrifuging space a lower pressure than the starting pressure and introducing into said centrifuging space a liquid to be evaporated, whereby the liquid can evaporate under the reduced pressure maintained in the centrifuging space and its vapors can join the centrifuged gas to be ejected with it.

The present invention aims at the same evaporative cooling effect of a fan, but modifies the method and the structure claimed in the parent application.

The invention is illustrated in FIG. 1 and 2 of the accompanying drawings.

FIG. 1 shows diagrammatically, partly in view and partly in a vertical cross section a side view of the apparatus.

FIG. 2 is a section 1—1 of FIG. 1.

In contrast to the parent application, the lower pressure is not only maintained in the centrifuging zone, but also in the entry zone. Furthermore, the flow restriction—required for maintaining the lower pressure—is not effected by a porous flow, but by pressure-control valve. Finally, the liquid to be evaporated is not introduced into the centrifuging space but into the entry zone.

As illustrated by way of example and diagrammatically in FIG. 1, a motor 1 drives a centrifugal impeller 2, which is surrounded by a housing 3, having an intake opening 5 and an exhaust guide 4. A walled space 6 forms the entry zone of the air. The bottom of space 6 is a sump for the water to be evaporated. This sump is connected by a communicating tube 7 with a tank 8, which holds a water supply. The tube 7 is shown broken away, as its length will depend on the intended degree of vacuum in space 6. The difference in the two water levels indicates merely diagrammatically, that there is a lower pressure above the water in space 6 than above the water in tank 8.

Air enters into the entry zone, the walled space 6, by entering the intake 11 of a pressure-controlled valve 10 and leaving it through tube 9, which is directed against the surface of the water in the sump, thereby stirring it. Air and water vapors then leave through opening 5, entering the centrifuging space of impeller 2 and being exhausted through tube 4.

The turnable knob 12 of valve 10, which conventionally varies the degree of the back-pressure by varying the tension of a spring, can be marked: "WARM"—"COOL"—"COOLER" to indicate the temperature effect of the pressure reduction. An example of such conventional valve is shown in United States Patent No. 1,327,474.

Having now explained the nature of my invention and shown by way of example the manner in which it may be performed.

I claim as my invention:

1. Apparatus for cooling and circulating air comprising a centrifugal blower, including a housing, a centrifugal impeller having an axis of rotation, means for rotatably journalling said impeller in said housing and for connecting said impeller to a source of rotary drive power, said housing having an air inlet concentric with said axis of rotation and on the intake side of said impeller together with a peripherally disposed air outlet on the discharge side of said impeller, means forming a closed air chamber communicating with said housing through said housing air intake, said chamber having a water sump portion below said housing air inlet, a water tank having its interior subject to atmospheric pressure, means connecting said water tank to supply water to said sump portion of said chamber, an adjustable spring biased air pressure reduction valve and means for connecting said valve to said chamber for admitting air to said chamber responsive to a drop in air pressure in said chamber below atmospheric pressure resulting from the rotation of said impeller, and means for adjusting the tension of said valve spring to vary the sub-atmospheric air pressure in said chamber during rotation of said impeller to thereby vary the temperature of the exhaust air of said centrifugal blower responsive to the adjustment of said air valve affecting the rate of evaporation of the water in said sump.

2. Apparatus as set forth in claim 1 and in which said air valve connecting means includes a passageway positioned to direct in-flowing air against the water in said sump to agitate the water and thereby increase the rate of evaporation.

References Cited in the file of this patent

UNITED STATES PATENTS

| 805,653 | Lowe | Nov. 28, 1905 |
| 1,032,536 | Gerli et al. | July 16, 1912 |
| 1,327,494 | Sims | Jan. 6, 1920 |
| 1,820,795 | Gordon et al. | Aug. 25, 1931 |
| 1,851,427 | Hinkle | Mar. 29, 1932 |
| 2,384,414 | Antrim | Sept. 4, 1945 |
| 2,417,010 | Mobley | Mar. 4, 1947 |
| 2,557,042 | Woolley | June 12, 1951 |
| 2,844,364 | Epifanio et al. | July 22, 1958 |
| 2,973,829 | Schlumbohm | Mar. 7, 1961 |

FOREIGN PATENTS

| 104,289 | Sweden | Apr. 21, 1942 |
| 649,633 | France | Sept. 3, 1928 |